United States Patent
Laemmle et al.

(10) Patent No.: US 11,521,789 B2
(45) Date of Patent: Dec. 6, 2022

(54) ACTIVELY COOLED INFRASTRUCTURE SIDE OF AN INDUCTIVE CHARGING SYSTEM

(71) Applicant: Mahle International GmbH, Stuttgart (DE)

(72) Inventors: Christopher Laemmle, Stuttgart (DE); Holger Schroth, Maulbronn (DE)

(73) Assignee: Mahle InternationI GmbH

( * ) Notice: Subject to any disclaimer, the term of this patent is extended or adjusted under 35 U.S.C. 154(b) by 368 days.

(21) Appl. No.: 16/673,948

(22) Filed: Nov. 4, 2019

(65) Prior Publication Data

US 2020/0143978 A1    May 7, 2020

(30) Foreign Application Priority Data

Nov. 5, 2018    (DE) .......................... 102018218841.6

(51) Int. Cl.
| | |
|---|---|
| H01F 27/28 | (2006.01) |
| H02J 7/02 | (2016.01) |
| H01F 38/14 | (2006.01) |
| H01F 27/10 | (2006.01) |
| H01F 27/08 | (2006.01) |
| B60L 53/302 | (2019.01) |

(Continued)

(52) U.S. Cl.
CPC .......... *H01F 27/2876* (2013.01); *B60L 53/12* (2019.02); *B60L 53/302* (2019.02); *H01F 27/085* (2013.01); *H01F 27/10* (2013.01); *H01F 38/14* (2013.01); *H02J 7/025* (2013.01); *B60K 6/28* (2013.01); *B60Y 2200/91* (2013.01); *B60Y 2200/92* (2013.01); *B60Y 2300/91* (2013.01); *F25B 30/06* (2013.01)

(58) Field of Classification Search
CPC .... H01F 27/2876; H01F 27/085; H01F 27/10; H01F 38/14; B60L 53/12; B60L 53/302; H02J 7/025; B60K 6/28; B60Y 2200/91; B60Y 2200/92; B60Y 2300/91; F25B 30/06
USPC ......................................................... 320/108
See application file for complete search history.

(56) References Cited

U.S. PATENT DOCUMENTS

| | | |
|---|---|---|
| 5,203,399 A | 4/1993 | Koizumi |
| 5,545,966 A | 8/1996 | Ramos et al. |

(Continued)

FOREIGN PATENT DOCUMENTS

| | | |
|---|---|---|
| DE | 4116044 A1 | 11/1991 |
| DE | 69508133 T2 | 7/1999 |

(Continued)

OTHER PUBLICATIONS

ENERPIPE GmbH, Hilpolstein: Warmeverluste minimieren, Pufferspeichersysteme von ENERPIPE (N a hwarmepufferspeicher), Aug. 2015, URL: https://www.enerpipe.de/produkte/pdl/?, Sep. 2, 2019.

(Continued)

*Primary Examiner* — Suresh Memula
(74) *Attorney, Agent, or Firm* — Fishman Stewart PLLC

(57) ABSTRACT

A stationary induction charging station for a vehicle is disclosed. The stationary induction charging station includes an induction charging device, an energy transfer module for contact-free energy transfer, and an electronic unit. According to an example, the energy transfer module and the electronic unit are spatially combined.

19 Claims, 2 Drawing Sheets

(51) Int. Cl.
  *B60L 53/12*  (2019.01)
  *F25B 30/06*  (2006.01)
  *B60K 6/28*  (2007.10)

(56) References Cited

U.S. PATENT DOCUMENTS

| | | | |
|---|---|---|---|
| 10,389,003 B2 | 8/2019 | Heeg et al. | |
| 2005/0225416 A1* | 10/2005 | Bonaquist | H01F 27/085 336/55 |
| 2013/0015809 A1* | 1/2013 | Frey | B60L 53/34 320/106 |
| 2013/0033227 A1* | 2/2013 | Gibbons, Jr. | B60L 53/38 320/108 |
| 2014/0132378 A1* | 5/2014 | Vafakhah | B60K 6/22 336/55 |
| 2014/0172338 A1* | 6/2014 | Lafontaine | G01R 25/00 702/65 |
| 2014/0175867 A1* | 6/2014 | Sung | B60L 50/51 307/9.1 |
| 2014/0220397 A1 | 8/2014 | Hirsch et al. | |
| 2015/0202970 A1* | 7/2015 | Huang | H02J 50/40 320/108 |
| 2015/0357687 A1 | 12/2015 | Heeg et al. | |
| 2016/0056664 A1* | 2/2016 | Partovi | H02J 50/12 307/104 |
| 2016/0176299 A1* | 6/2016 | Kautz | H02J 50/60 307/9.1 |
| 2016/0233723 A1 | 8/2016 | Lestoquoy et al. | |
| 2016/0381829 A1 | 12/2016 | Niizuma et al. | |
| 2017/0085136 A1* | 3/2017 | Pfeiffer | H04B 5/0037 |
| 2017/0264144 A1* | 9/2017 | Park | H02J 50/80 |
| 2017/0338023 A1 | 11/2017 | Ansari et al. | |
| 2018/0269714 A1* | 9/2018 | Samuelsson | H01F 27/2871 |
| 2019/0140481 A1* | 5/2019 | Keeling | H02J 50/60 |
| 2019/0271258 A1* | 9/2019 | Mendez Abrego | F01P 7/165 |
| 2019/0299790 A1* | 10/2019 | Smith | H01M 10/443 |
| 2019/0305826 A1* | 10/2019 | Park | H02J 7/02 |
| 2020/0027640 A1* | 1/2020 | Laemmle | H01F 38/14 |
| 2020/0135391 A1* | 4/2020 | Kwon | H01F 27/38 |

FOREIGN PATENT DOCUMENTS

| | | | | |
|---|---|---|---|---|
| DE | 102010044999 A1 | 3/2012 | | |
| DE | 102011084002 A1 | 4/2013 | | |
| DE | 102013217728 A1 | 3/2015 | | |
| DE | 102014210572 A1 | 12/2015 | | |
| DE | 102014218923 A1 | 3/2016 | | |
| DE | 102017200465 A1 | 11/2017 | | |
| EP | 3065152 A1 | 9/2016 | | |
| WO | 2016030413 A1 | 3/2016 | | |
| WO | WO-2017044973 A1 * | 3/2017 | | H02J 50/70 |
| WO | WO-2019170594 A1 * | 9/2019 | | H02J 50/005 |

OTHER PUBLICATIONS

English abstract for EP-3065152.
English abstract for DE-102010044999.
English abstract for DE-102013217728.

* cited by examiner

ACTIVELY COOLED INFRASTRUCTURE SIDE OF AN INDUCTIVE CHARGING SYSTEM

CROSS-REFERENCE TO RELATED APPLICATION

This application claims priority to German Application No. DE 10 2018 218 841.6 filed on Nov. 5, 2018, the contents of which are hereby incorporated by reference in its entirety.

TECHNICAL FIELD

The present invention relates to a stationary induction charging station for a vehicle comprising an induction charging device.

BACKGROUND

To increase the acceptance of electrically driven vehicles among end customers, it can be advantageous when the energy transfer between a stationary energy source and an energy storage device of the vehicle takes place in a contact-free manner. A contact-free energy transfer is advantageous for end customers, because charging cables, for example, do not need to be brought along or be carried, respectively. Stationary induction charging stations can furthermore be partially buried in the bottom area, so that a better integration in a cityscape or landscape is possible. Buried induction charging stations are further particularly well protected against damages caused by vandalism.

A stationary induction charging station, which is connected to a stationary energy source, can generate a time-varying magnetic field via a primary-side coil. The electrically operated vehicle has an induction charging device, which comprises a secondary-side induction coil. If the induction charging device is positioned in the area of the magnetic field of the stationary induction charging station, the time-varying magnetic field induces an alternating current or an alternating voltage, respectively, in the induction coil of the induction charging device. This induced alternating current or this induced alternating voltage, respectively, can be used to charge the energy storage device of the vehicle.

The efficiency of the inductive energy transfer increases with increased frequency of the alternating voltage applied at the primary coil. Stationary induction charging stations of the prior art thus comprise an energy transfer module, in which at least one primary-side induction coil is arranged, and an electronic unit, which transforms the alternating voltage, which is supplied to the energy transfer module, in a suitable manner. For this purpose, the electronic unit can comprise a power electronic unit, which transforms the supply frequency of the alternating voltage of typically 50 Hz or 60 Hz into a frequency range of at least 10 kHz to 200 kHz, in order to ensure a low-loss inductive energy transfer.

Heat energy, which has to be dissipated in order to prevent damage to the electronic unit, is created during the operation of the electronic unit. For this purpose, the electronic unit is arranged spatially separated from the energy transfer module, so that the heat energy of the electronic unit can be output to the surrounding area by means of air cooling.

Due to the spatial separation, which can typically lie in the magnitude of 5 m or more, the high-frequency alternating voltage has to be transferred to the energy transfer module via suitable electrical lines. Due to the high frequency of the applied alternating voltage, these electrical lines have to have a suitable electromagnetic shield, in order to protect the surrounding area of the stationary induction charging station against unwanted interference emissions.

It is a disadvantage of the prior art that the electromagnetic shield is cost-intensive and that, due to the air cooling, the electronic unit represents an acoustic interference source. It is a further disadvantage that, due to the air cooling, the electronic unit has to be installed outside of the driving surface, so that an optical integration of the stationary induction charging station in the landscape or cityscape, respectively, is not possible. The accessible electronic unit is furthermore subjected to possible damages caused by vandalism.

SUMMARY

The present invention has the object of specifying a stationary induction charging station of the above-mentioned type, which can be produced more easily and more cost-efficiently, wherein a better integration of the stationary induction charging station in the landscape or cityscape, respectively, is additionally made possible.

This problem is solved according to the invention by means of the subject matters of the independent claims. Advantageous embodiments are subject matter of the dependent claims.

The present invention is based on the general idea of spatially combining the energy transfer module and the electronic unit.

The stationary induction charging station according to the invention for a vehicle comprising an induction charging device comprises an energy transfer module for the contact-free energy transfer, and an electronic unit, wherein the energy transfer module and the electronic unit are spatially combined. The energy transfer module can be connected in an electrically conductive manner to the electronic unit. The electronic unit can be connected in an electrically conductive manner to an electrical energy source, such as, for example, a power supply network.

The electronic unit can have a power electronic module, which can comprise, for example, converters and/or resonant circuits and/or power factor compensation filters (Power Factor Compensation, abbreviated as PFC). The electronic unit can also have at least one communication module and/or a positioning module and/or a safety-related module.

The energy transfer module and the electronic unit can be combined in a housing. Spatially combined can be understood to mean that the shortest spatial distance between the electronic unit and the energy transfer module is less than 2 m, in particular 1 m. It can be provided thereby that the shortest spatial distance between the electronic unit and the energy transfer module is less than the sum of the largest dimension of the electronic unit and of the largest dimension of the energy transfer module. It can further be provided that the shortest spatial distance between the electronic unit and the energy transfer module is less than the largest dimension of the electronic unit or of the energy transfer module.

The energy transfer module can comprise at least one induction coil, which can be configured, for example, as helical flat coil or also as double-D coil. Via the electronic unit, the induction coil can be supplied with electrical energy, in particular with a high-frequency alternating voltage in a frequency range of between 10 kHz and 200 kHz.

The stationary induction charging station can have at least one magnetic field conductor, which is configured for conducting the magnetic field and which increases the efficiency of the energy transfer. Compared to air, the magnetic field conductor has a higher magnetic permeability and can at least partially be made of ferrimagnetic and/or ferromagnetic materials. The magnetic field conductor can be configured of one plate element or also of a plurality of plate elements.

A shield element can be provided between the energy transfer module and the electronic unit in order to protect the electronic unit against a destruction by the electromagnetic fields. The shield element, which can be configured as shield plate, can also be made of an electrically conductive material, wherein the thickness of the shield element can correspond to at least a skin depth, which the magnetic and electric fields can have in the case of a specified frequency of the energy transfer for the electrically conductive material of the shield element. The shield element can be made, for example, of aluminum.

Due to the design according to the invention of the stationary induction charging station, the use of electrical lines with cost-intensive electromagnetic shields can be foregone.

In the case of a further advantageous embodiment of the solution according to the invention, it is provided that the energy transfer module and/or the electronic unit are thermally connected to a cooling element, through which fluid can flow, via at least one heat conductor unit. The cooling element, through which fluid can flow, can be a cooling plate, through which fluid can flow. Such a cooling plate can have a cuboidal and/or plate-shaped design.

It can be provided that the cooling element is configured as cooling element, through which liquid flows, through which a cooling liquid flows.

Compared to air, the heat conductor unit can have a lower thermal resistance. The heat conductor unit can be, for example, an adhesive with a high heat conductivity. The heat conductor unit can be a heat conducting film and/or a heat conducting paste and/or a heat conducting casting compound.

In the case of an advantageous further development of the solution according to the invention, it is provided that the cooling element, through which fluid can flow, is fluidically connected to a fluid circuit, wherein a fluid conveying device conveys a fluid through the fluid circuit, wherein the fluid absorbs waste heat of the induction charging device when flowing through the cooling element. It can be provided that the fluid is a liquid, it can in particular be provided that the liquid can comprise water, a coolant, a refrigerant, and/or oil. This provides for a more effective cooling of the stationary induction charging station, so that the energy transfer module and the electronic unit can be arranged in spatial proximity to one another or spatially combined, respectively.

It can be provided that the cooling element has a fluid inlet and a fluid outlet, wherein the fluid inlet is fluidically connected to the fluid outlet by means of flow-through ducts, wherein the flow ducts permeate the cooling element.

A sufficient cooling of all components of the stationary induction charging station can be attained by means of such a thermal management, so that for example all of the components required for operating the stationary induction charging station can be accommodated in a common housing even in the case of high charging capacities, wherein the stationary induction charging station can be buried, for example, in the ground or can also be arranged on the ground surface.

In the case of a further advantageous embodiment of the solution according to the invention, it is provided that the fluid circuit has at least one heat exchanger for dissipating the heat energy absorbed by the fluid.

In the case of an advantageous further development of the solution according to the invention, it is provided that the heat exchanger is integrated in a local heat network and/or district heat network. The resulting heat energy can thereby be reused, for example as heat energy.

In the case of a further advantageous embodiment of the solution according to the invention, it is provided that the heat exchanger is configured as liquid-air heat exchanger, in order to transfer the heat energy absorbed by the fluid to the ambient air of the induction charging station.

The liquid-air heat exchanger can have a cooling element, through which fluid can flow, comprising arranged air fins. The liquid-air heat exchanger can further have a fan unit for ensuring a sufficient air circulation at the liquid-air heat exchanger or at the air fins, respectively.

In the case of an advantageous further development of the solution according to the invention, it is provided that the heat exchanger transfers the heat energy absorbed by the fluid to the surrounding area of the induction charging station. The ground or also a partial area of a garage or of a parking space, for example, can be part of the surrounding area of the induction charging station.

In the case of a further advantageous embodiment of the solution according to the invention, it is provided that the heat exchanger is thermally connected to a heat storage device so as to make it possible to store the heat energy.

In the case of an advantageous further development of the solution according to the invention, it is provided that the stationary induction charging station has a housing, which at least partially forms the cooling element so as to provide for a particularly compact construction of the stationary induction charging station. It can be provided that the housing has a fluid inlet and a fluid outlet, wherein the fluid inlet is fluidically connected to the fluid outlet by means of flow-through ducts, wherein the flow-through ducts permeate the housing.

It can be provided that the housing has a fluid inlet and a fluid outlet, wherein the fluid inlet is fluidically connected to the fluid outlet through a housing interior. The components of the stationary induction charging station can be arranged in the housing interior in such a way that even though a thermal connection to a fluid can be established, damages to the components can be prevented by means of suitable protective housings.

It can be provided that the components of the stationary induction charging station are thermally uncoupled from the housing via a thermal insulator, so that a heat transfer essentially takes place to a fluid, which flows through the housing interior. A thermal insulator can be present, when the latter has a heat conductivity of less than 10 W/(mK).

All components, which are arranged inside the housing, are part of the components of the stationary induction charging station.

In the case of a further advantageous embodiment of the solution according to the invention, it is provided that the fluid is electrically insulating in the fluid circuit, so as to avoid short-circuits in response to an unwanted entry of the fluid into the electronic unit. It can be provided that an electrically insulating liquid is used as fluid.

In the case of an advantageous further development of the solution according to the invention, it is provided that the stationary induction charging station is cooled by means of spray cooling. A fluid, in particular a cooling medium and/or a refrigerating medium, is thereby sprayed onto the areas of the stationary induction charging device, which are to be cooled, wherein the fluid evaporates due to the energy absorption, and subsequently condensates in a condenser unit and/or a heat sink (for example a cooling plate or the ground) by dissipating the heat energy. The condensed fluid can subsequently be supplied to the stationary induction charging device again. The heated fluid or cooling medium, respectively, can condensate again at a thermal sink in the housing and can be used as spray cooling again.

In the case of a further advantageous embodiment of the solution according to the invention, it is provided that the stationary induction charging station has an operating device. The operating device can be used to control and/or operate the stationary induction charging station, wherein the operating device can be arranged at a distance from the energy transfer module and the electronic unit for this purpose. The operating device can be connected to the electronic unit so as to communicate therewith. The liquid-air heat exchanger can be combined with the operating device and can include a part of the electronic unit.

A communicating connection is to be understood in such a way here that a bidirectional or unidirectional data connection, by means of which electric control, regulating and/or measuring signals in analog or digital form can be transferred, can be provided between two components, which are connected to one another so as to communicate. The communication can be realized by means of a bus system. The communicating connection can take place via electrical lines at the typical supply frequency by foregoing electromagnetic shields. Such an electrical line can be a direct current voltage line or also an alternating current voltage line.

It can be provided that a heat exchanger, in particular a liquid-air heat exchanger, which is fluidically connected to the fluid circuit of the stationary induction charging station, is provided in and/or at the operating device.

In the case of an advantageous further development of the solution according to the invention, it is provided that the stationary induction charging station is at least partially embedded in a driving surface. It can also be provided that the stationary induction charging station is buried completely in the driving surface. The stationary induction charging station can thereby be integrated optimally in the landscape or cityscape, respectively, wherein the induction charging station is additionally protected particularly well against damages caused by vandalism.

In the case of a further advantageous embodiment of the solution according to the invention, it is provided that the stationary induction charging station bears on a driving surface and thus provides for an installation, which is as simple as possible and which can be used, for example, for parking spaces or in garages.

In the case of an advantageous further development of the solution according to the invention, it is provided that the stationary induction charging station is aero-acoustically optimized, so that the noise emissions are reduced to a minimum.

It can further be provided that the invention is completely or at least partially implemented or integrated, respectively, on the vehicle side in an analogous manner.

In the case of an advantageous further development of the solution according to the invention, it is provided that the fluid is a liquid. It can in particular be provided that the liquid can comprise water, a coolant, a refrigerant and/or oil. This provides for a more effective cooling of the stationary induction charging station, so that the energy transfer module and the electronic unit can be arranged in spatial proximity to one another or spatially combined, respectively.

A cooling process can, for example, be divided into three parts: 1) the collecting of the heat and transfer into a cooling medium, 2) the onward transportation of the heat to a heat exchanger with the surrounding area, 3) the heat dissipation from the cooling medium to the surrounding area.

In step 2), a liquid cooling provides the advantage in an exemplary manner that, due to the higher heat capacity, significantly less volume per watt of cooling capacity is required. For example the required installation space for cooling ducts can be reduced thereby, in particular to significantly below 10% as compared to an air cooling. With a liquid cooling, the high heat densities in individual electrical components can also be realized in the case of a highly limited available installation space for cooling components. A compact setup of the stationary induction charging station can thus be made possible.

In the case of an advantageous further development of the solution according to the invention, it is provided that the fluid is enclosed in the fluid circuit against a surrounding area of the fluid circuit and/or that the fluid in the fluid circuit is fluidically separated from a surrounding area of the fluid circuit. The fluid circuit can comprise fluid lines. The fluid circuit can be configured as closed fluid circuit, in particular as closed cooling circuit. The fluid circuit can have at least one heat exchanger, in particular an air-liquid heat exchanger and/or an air-liquid coolant heat exchanger. The heat exchanger can be fluidically embedded into the fluid circuit.

The fluid, in particular a liquid coolant, can form a circulating medium, which can circulate in a closed fluid circuit, in particular in a closed cooling circuit, within the components of the circuit. In other words, it can be provided that a fluid, in particular a liquid coolant, is neither introduced from the outside (surrounding area), nor output to the outside during the operation of the fluid circuit, in particular during the operation of the cooling circuit.

In the case of an advantageous further development of the solution according to the invention, it is provided that the local thermal resistance of the heat conductor unit varies, in particular that the local thermal resistance of the heat conductor unit varies across the entire lateral expansion. The local thermal resistance of the heat conductor unit can vary across the entire lateral expansion of the heat conductor unit.

The lateral expansion of the heat conductor unit can be aligned perpendicular to the main functional direction of the heat conductor unit. The main function of the heat conductor unit can be an uniaxial heat conduction from the heat source to the heat sink. The lateral expansion can be described as the surface which is aligned perpendicular to the heat conduction direction. Expressed simply, the lateral expansion of the heat conductor unit can be defined by the surface of the heat sink facing the heat source, since the local vectorial heat flow is always aligned perpendicular to the heat sink.

At least in section the local thermal resistance of the heat conductor unit can form a linear variation and/or a non-linear variation and/or a stepped variation and/or a unsteady variation with respect to the lateral expansion of the heat conductor unit It can furthermore be provided that the heat conducting unit has a particularly low thermal resistance in areas with stronger heat loss sources (e.g. >5 W/cm$^2$, in particular on the side of the electronic unit), which improves the cooling capacity of this strong local heat loss source. It can also be provided to use materials with anisotropic heat conductivity, in particular material with particularly high lateral heat conductivity (e.g. graphite film) in the heat conducting unit. The heat flux density in the thermal path to the cooling element, through which fluid can flow, can be reduced thereby, which brings advantages in the technical design of the fluid guidance.

A particularly low thermal resistance is given with values <200 mm² K/W. For particularly complex, ceramic-based material bonds (e.g. silver sintering), values of <20 mm² K/W can also be achieved.

In the case of an advantageous further development of the solution according to the invention, it is provided that the heat conductor unit is locally supplemented or replaced by means of an active heat pump at at least one position.

In a further special embodiment, it can furthermore be provided that the heat conducting unit is configured as active heat conducting unit, i.e. as active heat pump, in one or several areas with extremely high heat loss sources (e.g. >15 W/cm²). Possible embodiments of an active heat pump unit are known among experts under the terms Heatpipe, Thermosiphon or also thermoelectrical heat pump. The heat pump unit can be configured as Heatpipe, Thermosiphon or also as thermoelectrical heat pump. Each active heat pump can be configured of one or a plurality of heat pump units of identical or different design. Both the improvement of the cooling itself (longitudinal pumping direction of the heat) and the reduction of the heat flux density (lateral pumping direction of the heat) of the extremely high heat loss sources can be the goal of these active heat conducting units.

The longitudinal pumping direction can be the direction perpendicular to the surface of the heat sink. The lateral pumping direction can be any direction parallel to the surface of the heat sink. It may be provided that each type of heat pump also combines both pumping directions.

In the case of an advantageous further development of the solution according to the invention, it is provided that the fluid is electrically insulating in the fluid circuit, and flows through a housing interior of the housing, wherein the fluid at least partially wets the housing and at least partially components of the stationary induction charging station and/or flows directly around them and/or flows directly against them. The housing can be made of a thermal insulating material. The housing can have a corresponding fluid inlet and a corresponding fluid outlet, so that the housing can be fluidically connected to a fluid circuit. The housing forms a housing interior, in which the components of the stationary induction charging station 1 can be arranged. A fluid can flow through the housing interior, wherein the fluid at least partially wets inner surfaces of the housing interior and/or flows directly around them and/or flows directly against them. Inner surfaces can be the surface sections of the housing, which limit and/or form the housing interior.

In the case of an advantageous further development of the solution according to the invention, it is provided that the fluid in the fluid circuit is electrically insulating, and flows freely and without further closed fluid ducts through the housing interior. The expression "flows freely and without further closed fluid ducts" can be understood such that the fluid at least partially wets inner surfaces of the housing interior and/or flows directly around them and/or flows directly against them. It can be provided thereby that a guidance of the fluid in the housing interior is at least partially formed by inner surfaces of the housing interior. Further closed fluid ducts, in particular fluid lines, which are formed separately from the housing, can be foregone thereby. Inner surfaces can be the surface sections of the housing, which limit and/or form the housing interior. The housing can be made of a thermal insulating material. The housing can have a corresponding fluid inlet and a corresponding fluid outlet, so that the housing can be fluidically connected to a fluid circuit. The housing can form a housing interior, in which the components of the stationary induction charging station 1 can be arranged.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
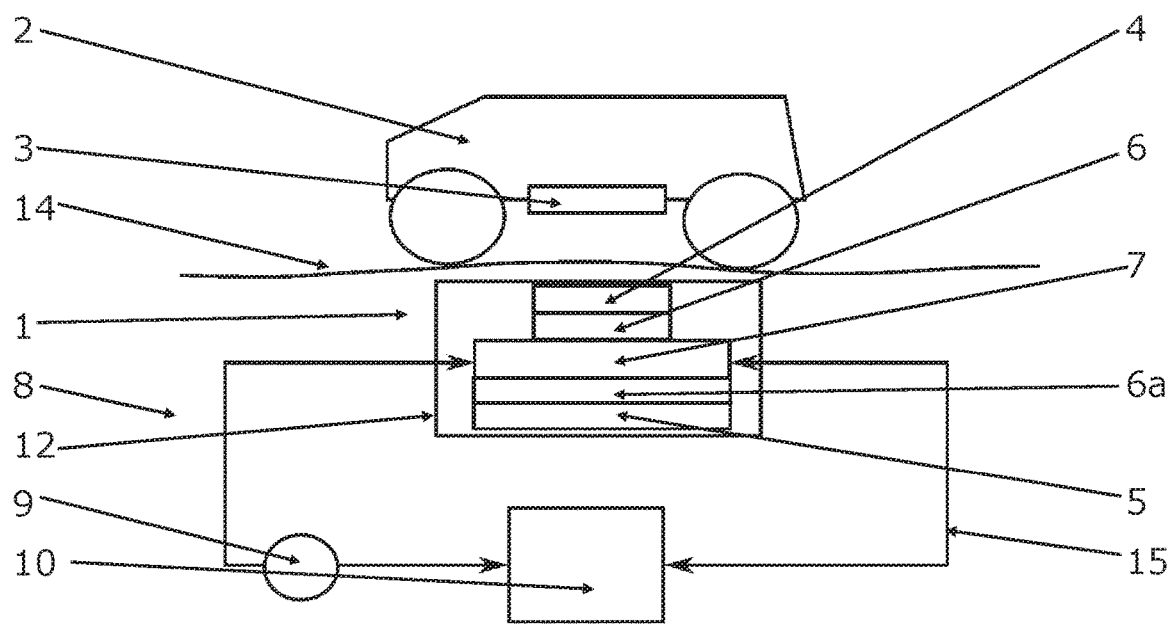
FIG. 1 shows a highly simplified illustration of a stationary induction charging station according to the invention.

A highly simplified illustration of a stationary induction charging station 1 according to the invention is illustrated in FIG. 1, which is buried in a driving surface 14. A vehicle 2, which can be configured, for example, as electric vehicle or as hybrid vehicle, is positioned above the stationary induction charging station 1.

The vehicle 2 has an induction charging device 3, which has at least one secondary induction coil, so that a contact-free energy transfer between the induction charging device 3 and the stationary induction charging device 1 can take place. For this purpose, the stationary induction charging station 1 has an energy transfer module 4, which comprises at least one primary-side induction charging device, to which an alternating voltage is applied. The energy transfer module 4 generates a time-varying magnetic field, which, in the induction charging device 3, induces an alternating voltage or an alternating current, respectively, which can be supplied to an energy storage device of the vehicle 2.

The stationary induction charging station 1 comprises a housing 12, in which the energy transfer module 4, an electronic unit 5, a first heat conductor unit 6, a second heat conductor unit 6a, as well as a cooling element 7 are provided. The first heat conductor unit 6 is arranged between the energy transfer module 4 and the cooling element 7. The second heat conductor unit 6a is arranged between the cooling element 7 and the electronic unit 5. Due to the fact that the components of the stationary induction charging station 1 are spatially combined, a compact and cost-efficient setup results, because shielded electrical lines for high-frequency alternating voltages can be foregone.

The electronic unit 5 can be connected to a non-illustrated electrical energy source via non-illustrated electrical connecting lines. The electronic unit 5 is connected in an electrically conductive manner to the energy transfer module 4, and transforms the electrical energy provided by the non-illustrated electrical energy source, before it is supplied to the energy transfer module 4. It can in particular be provided that the electronic unit 5 has at least one power electronic module, in order to attain a frequency increase of the provided alternating voltage.

A fluid can flow through the cooling element 7, wherein the fluid is conveyed in a fluid circuit 8, which can comprise fluid lines 15, by means of a fluid conveying device 9. The fluid circuit 8 has a heat exchanger 10.

The heat energy, which is present at the energy transfer module 4, can be transferred to the cooling element 7 via the heat conductor unit 6. The heat energy created at the electronic unit 5 can be transferred to the cooling element 7 via the heat conductor unit 6a. The cooling element 7 transfers the heat energy, which is supplied to it, to the fluid, which heats up when flowing through the cooling element 7. After the fluid flows out of the cooling element 7, it can dissipate the absorbed heat energy in the heat exchanger 10 again and can thus cool it down. The cooled-down fluid can flow in the cooling element 7 again, in order to provide for a continuous removal of the resulting heat energy in the stationary induction charging station 1. It can be provided thereby that the fluid is a liquid.

The heat exchanger 10 can provide for a heat exchange between a surrounding area of the stationary induction charging station 1 and the fluid, wherein the surrounding area can be, for example, the ground or also the ambient air of the stationary induction charging station. It is also conceivable that the heat exchanger is thermally attached to a local heat network and/or to a district heat network, so that the heat energy generated by the stationary induction charging station 1 can be used, for example, for heating living spaces. Such a design provides for a particularly high energy efficiency, because only little energy remains unused.

Figure 2:
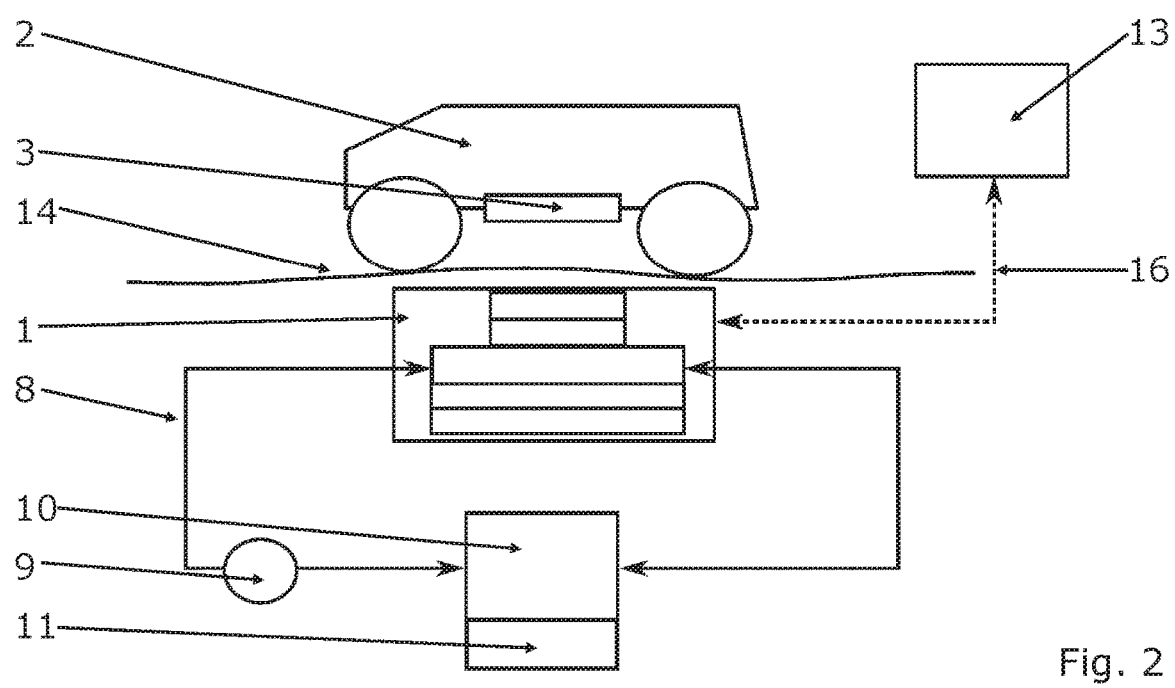
FIG. 2 shows a highly simplified illustration of a stationary induction charging station according to the invention comprising an operating device.

Compared to FIG. 1, the stationary induction charging station 1 in FIG. 2 has an operating device 13, which is arranged spaced apart from the energy transfer module 4 and the electronic unit 5, wherein it can be provided that this operating device 13 is integrated, for example, in an operating column or in a wall of a garage. The operating device 13 can be connected to the electronic unit 5 so as to communicate therewith via a communication line 16, which does not have to have an electromagnetic shield.

In FIG. 2, the heat exchanger 10 is thermally attached to a heat storage device 11, so that the heat energy dissipated by the fluid can be temporarily stored. Alternatively, the air-heat exchanger 10 can be integrated in the operating device 13.

Figure 3:
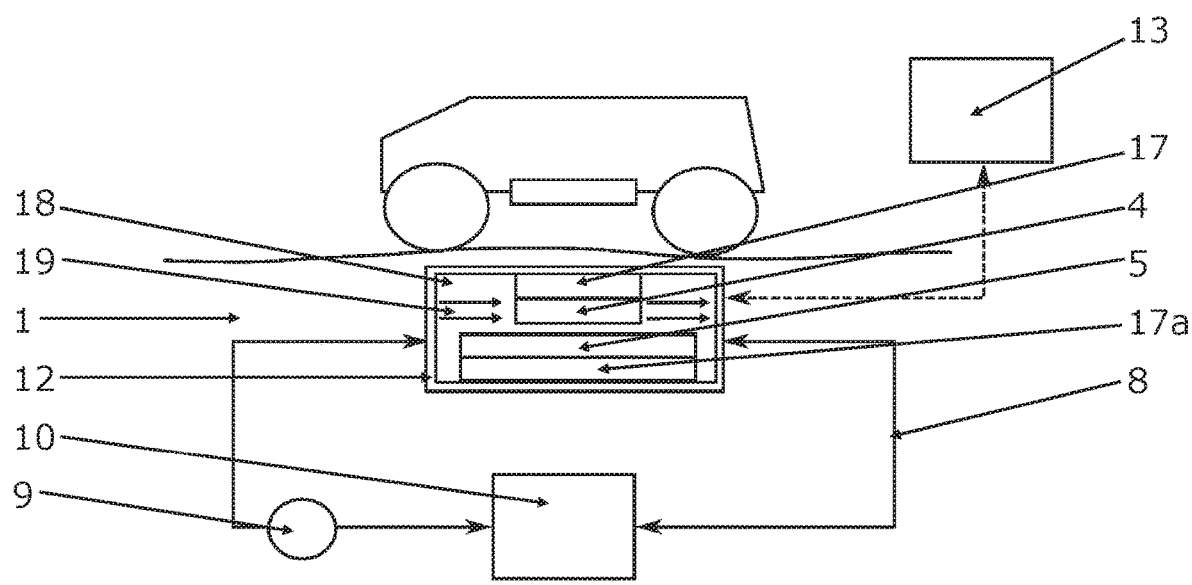
FIG. 3 shows a highly simplified illustration of a further embodiment of a stationary induction charging station according to the invention.

FIG. 3 shows an embodiment of the stationary induction charging station 1, in which the housing 12 forms a cooling element. In this case, the energy transfer module 4 is essentially thermally decoupled from the housing 12 via a first thermal insulator 17. The electronic unit 5 is further essentially thermally decoupled from the housing 12 via a second thermal insulator 17a. The housing 12 can be made of a thermal insulating material. The housing 12 can have a corresponding fluid inlet and a corresponding fluid outlet, so that the housing 12 can be fluidically connected to the fluid circuit 8. The housing 12 forms a housing interior 18, in which the components of the stationary induction charging station 1 are arranged. A fluid can flow through the housing interior 18, wherein the flow is suggested symbolically by means of the arrows 19 in FIG. 3. A particularly compact setup of the stationary induction charging station 1 is possible thereby. In addition, thermal losses to the surrounding area can be reduced thereby, so that the amount of heat energy, which is fed, for example, into a district heat network, can be maximized.

Figure 4:
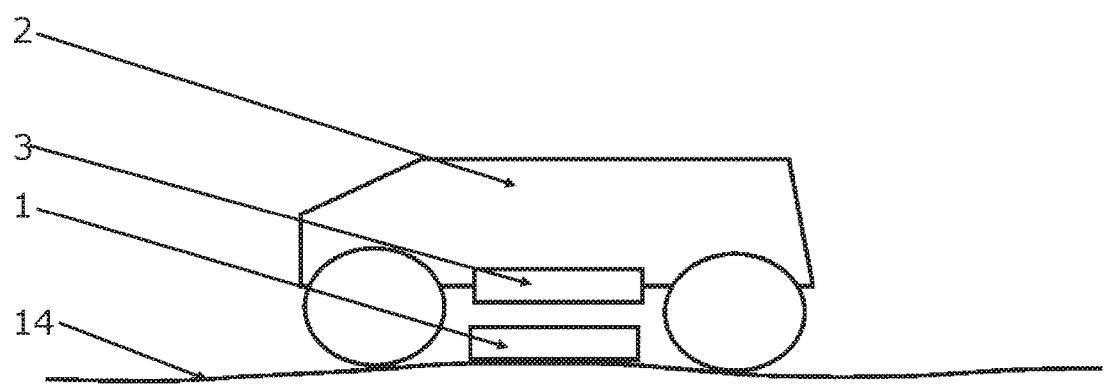
FIG. 4 shows a highly simplified illustration of a further embodiment of a stationary induction charging station according to the invention, which is arranged on a driving surface.

A highly simplified illustration of a further embodiment of a stationary induction charging station 1 according to the invention, which is arranged on a driving surface 14, is shown in FIG. 4. This provides for a quick and cost-efficient retrofitting of existing roadways. A vehicle 2, which has an induction charging device 3, can be supplied with electrical energy via the induction charging station 1.

The invention claimed is:

1. A stationary induction charging station for a vehicle, comprising:
   an induction charging device;
   an energy transfer module for contact-free energy transfer;
   an electronic unit;
   wherein the energy transfer module and the electronic unit are spatially combined; and
   wherein at least one of the energy transfer module and the electronic unit is thermally connected to a cooling element via at least one heat conductor unit, the cooling element structured and arranged to communicate a through-flow of fluid.

2. The stationary induction charging station according to claim 1, wherein:
   the cooling element is fluidically connected to a fluid circuit,
   a fluid conveying device is provided to convey a fluid through the fluid circuit, and
   wherein the fluid absorbs waste heat when flowing through the cooling element.

3. The stationary induction charging station according to claim 2, wherein the fluid is electrically insulating in the fluid circuit.

4. The stationary induction charging station according to claim 2, wherein the fluid is a liquid.

5. The stationary induction charging station according to claim 2, wherein at least one the fluid is enclosed in the fluid circuit against a surrounding area of the fluid circuit and the fluid in the fluid circuit is fluidically separated from a surrounding area of the fluid circuit.

6. The stationary induction charging station according to claim 2, wherein the fluid is electrically insulating in the fluid circuit, and flows through a housing interior of a housing that at least partially defines the cooling element, and wherein the fluid at least one of at least partially wets inner surfaces of the housing interior, flows directly around the inner surfaces, and flows directly against the inner surfaces.

7. The stationary induction charging station according to claim 2, wherein the fluid circuit includes at least one heat exchanger.

8. The stationary induction charging station according to claim 7, wherein the heat exchanger is integrated in at least one of a local heat network and a district heat network.

9. The stationary induction charging station according to claim 7, wherein the heat exchanger is structured and arranged as a liquid-air heat exchanger that transfers heat energy absorbed by the fluid to ambient air.

10. The stationary induction charging station according to claim 7, wherein the heat exchanger transfers heat energy absorbed by the fluid to a surrounding area.

11. The stationary induction charging station according to claim 7, wherein the heat exchanger is thermally connected to a heat storage device.

12. The stationary induction charging station according to claim 1, further comprising a housing, structured and arranged to at least partially define the cooling element.

13. The stationary induction charging station according to claim 1, further comprising a spray cooler.

14. The stationary induction charging station according to claim 1, further comprising an operating device.

15. The stationary induction charging station according to claim 1, wherein the stationary induction charging station is at least partially embedded in a driving surface.

16. The stationary induction charging station according to claim 1, wherein the stationary induction charging station bears on a driving surface.

17. The stationary induction charging station according to claim 1, wherein the stationary induction charging station is aero-acoustically optimized.

18. The stationary induction charging station according to claim 1, wherein a local thermal resistance of the at least one heat conductor unit varies.

19. The stationary induction charging station according to claim 1, wherein the at least one heat conductor unit is locally supplemented or replaced via an active heat pump at least at one position.

\* \* \* \* \*